April 1, 1958     C. N. VALENTINE     2,828,543
LAWN TRIMMER
Filed April 25, 1956                           2 Sheets-Sheet 1
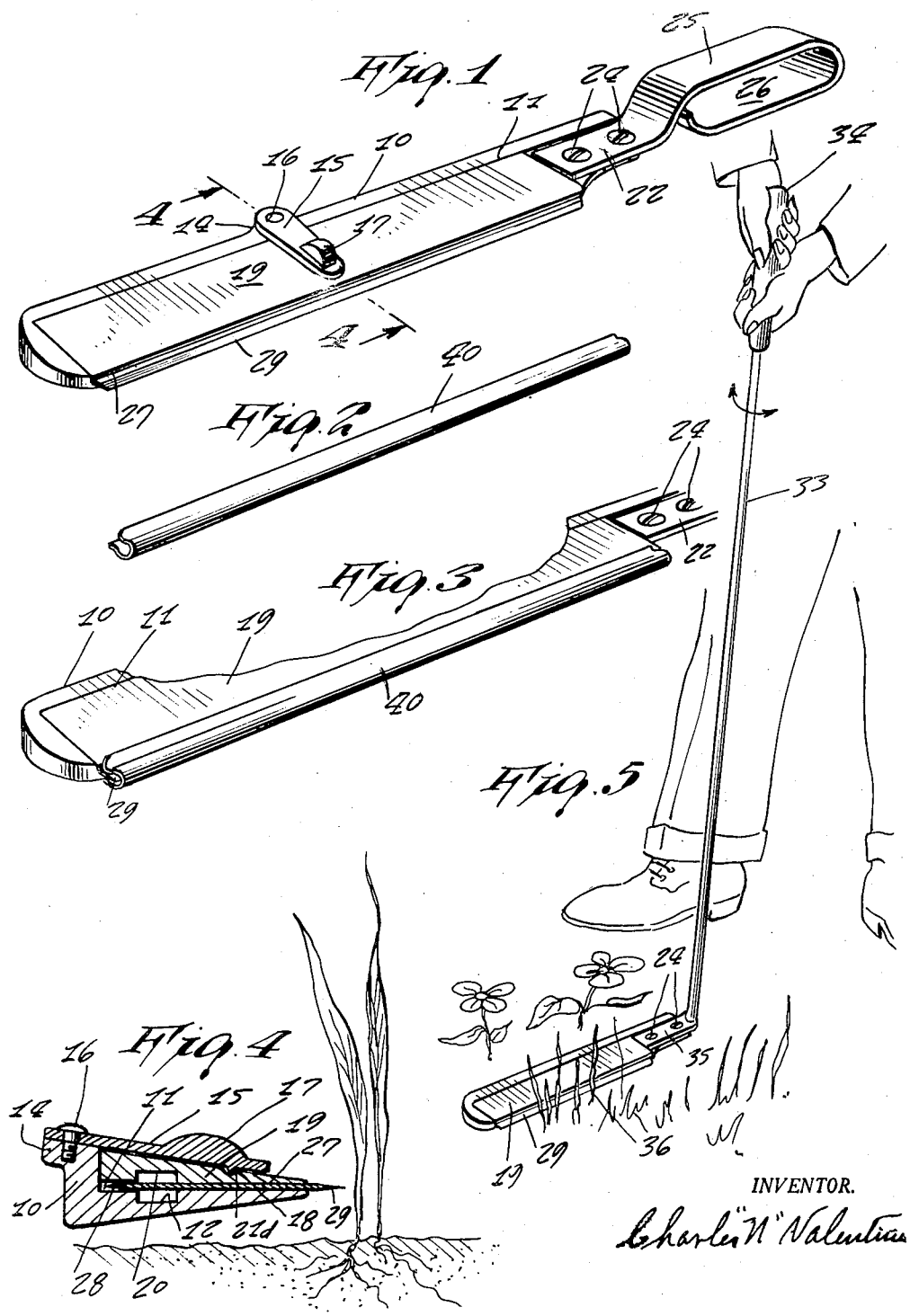
INVENTOR.
Charles N. Valentine April 1, 1958    C. N. VALENTINE    2,828,543
LAWN TRIMMER
Filed April 25, 1956    2 Sheets-Sheet 2
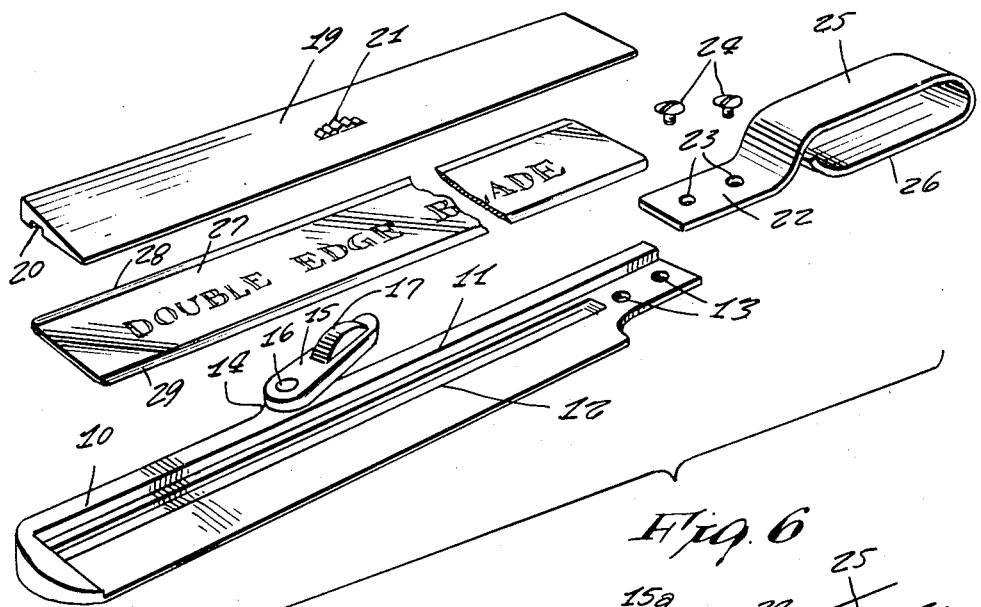
Fig. 6
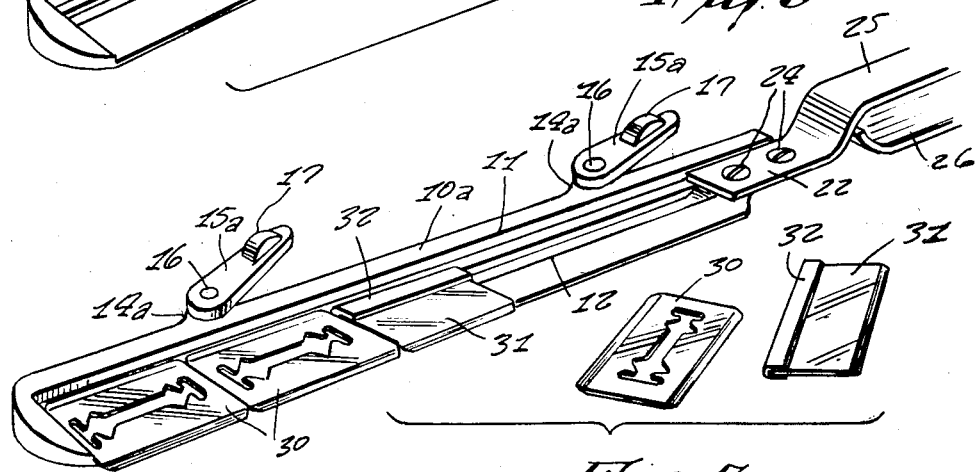
Fig. 7
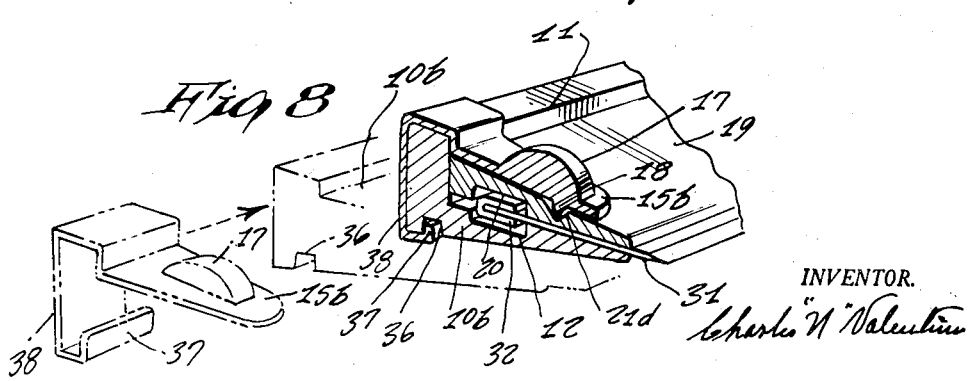
INVENTOR.
Charles N. Valentine ated Apr. 1, 1958

United States Patent Office 2,828,543
Patented Apr. 1, 1958

2,828,543

LAWN TRIMMER

Charles N. Valentine, San Diego, Calif.

Application April 25, 1956, Serial No. 580,533

1 Claim. (Cl. 30—299)

This invention relates to lawn trimming devices.

It is an object of the present invention to provide a lawn trimmer which is faster and sharper than such devices heretofore used and which operates on the sickle principle.

It is another object of the present invention to provide a lawn trimmer of the above type which is adapted to use a plurality of different cutting blades of different types without changing any of the parts of the device.

It is still another object of the present invention to provide a lawn trimmer of the above type which may use old or new double edge, single edge razor blades and wherein any one of the blades may be quickly and easily changed without requiring special tools.

Other objects of the invention are to provide a lawn trimmer bearing the above objects in mind which is of simple construction, has a minimum number of parts, is inexpensive to manufacture and efficient in use.

For other objects and for a better understanding of the invention, reference may be had to the following detailed description taken in connection with the accompanying drawing, in which:

Figure 1 is a perspective view of a preferred embodiment of the present invention;

Fig. 2 is a perspective view of a guard for the cutting edge of the device shown in Fig. 1;

Fig. 3 is a fragmentary perspective view of the device showing the guard in place thereon;

Fig. 4 is a transverse sectional view taken along the line 4—4 of Fig. 1;

Fig. 5 is a perspective view showing the device in operative use with a modified handle and being used in the manner of a golf club without bending;

Fig. 6 is an exploded perspective view of the parts comprising the invention;

Fig. 7 is a perspective view with the cover plate shown removed of a modified form of the present invention; and Fig. 8 is a fragmentary perspective view shown partly in section of a still further modified form of the present invention shown in assembled relationship.

Referring now more in detail to the drawing, and more particularly to Figs. 1 through 6, 10 represents an elongated rectangular base plate having a large recess 11 extending through one end and one side thereof, substantially as illustrated (Fig. 6). The base plate 10 is also provided with a narrow elongated, rectangular recess 12 within recess 11 which extends from one end thereof and which terminates short at the other end thereof, permitting the internally threaded openings 13 aligned with the recess 12. When the surface of the recessed portion 11 is disposed in a horizontal plane (Fig. 4), the undersurface of the base plate 10 is inclined upwardly towards the open side of the recess.

The base plate 10 along the upper edge thereof near the center is integrally formed with the laterally enlarged lug 14 which pivotally mounts thereon a spring member 15 by means of the screw 16 (Fig. 4), the free end of the spring member 15 on the upper end thereof being integrally formed with the raised serrated portion 17 adapted to be engaged by the thumb whereby to effect its rotational movement about the screw 16. The undersurface of the spring member 15 is integrally formed with the depending protrusion 18 of triangular cross section for a purpose which will hereinafter become clear.

As shown in Fig. 6, a separable rectangular cover plate 19 having a horizontal undersurface and a downwardly inclined upper surface is provided and is adapted to fit within the recess 11, the undersurface of the cover plate 19 having a longitudinally extending rectangular recess 20 adapted to be aligned vertically with the recess 12. The upper surface of the cover plate 19 at the center thereof is integrally formed with the raised serrations 21 adapted to be engaged by the protrusion 18 on the undersurface of the spring member 15 whereby to retain the cover plate in operative position (Fig. 1). Thus, upon rotating the spring member 15 by means of the serrated raised portion 17 to the inoperative position of Fig. 6, the coverplate 19 may be removed and upon replacing the same, will be locked in position by rotating the spring member to the operative position of Fig. 1. The tension of the spring member 15 will retain the bottom plate 10 and cover plate 19 in firm engagement with each other. Instead of the serrations 21 of Fig. 6, the cover plate 19 may be provided with the indentation 21d of Fig. 4 for the same purpose. An interchangeable handle is provided (Fig. 6) and includes the flat rectangular strip 22 adapted to overlie the openings 13 in the base plate and having the openings 23 aligned therewith, the strip 22 being secured thereat by means of the screws 24. The outer end of the strip 22 is integrally formed with the upwardly offset handle portion 25 which is in turn integrally formed with the downwardly and forwardly bent portion 26, permitting the handle to be grasped within one hand in the manner of scythe.

An elongated double edge blade similar to that employed in safety razors but of greater length 27 is provided having the cutting edges 28 and 29 which may be reversed. The blade is positioned within the recess 11 and retained thereat by means of the cover plate 19 and the spring member 15. It will be noted that when the blade 27 is in proper position the cutting edge 29 will extend outwardly beyond the bottom plate 10 and upper plate 19 to provide a sharp cutting edge (Fig. 1) while the inner edge 28 will be freely spaced from the recess 11 (Fig. 4) to protect the latter when not in use. When the edge 29 becomes dull, the blade can, of course, be reversed to bring the cutting edge 28 into operative position.

As shown in Fig. 7, the device may also be used with the double edge conventional razor blades 30 as well as the single edge blades 31, in the latter case the vertically aligned grooves 12 and 20 providing clearance for the reinforced handle portion of the blades 31, indicated at 32.

The handle above mentioned may be easily and readily removed to be replaced by the golf club like handle comprising the elongated shaft 33 provided at its upper end with the handle portion 34 and integrally formed at its lower end with the horizontally disposed plate 35 adapted to be secured to the base plate in the same manner as the strip 22. Thus, upon removing the screws 24, the handles may be easily and readily interchanged for the convenience of the user and when employing the shaft 33 to permit the weeds 36 to be trimmed without the necessity of bending.

Referring now particularly to Fig. 7, there is shown a modified form of the present invention wherein the base plate 10a is integrally formed with a pair of longitudinally spaced lugs 14a, each of which rotatably mounts a spring member 15a by means of the screws 16.

In other respects the form of the invention shown in

Fig. 7 is the same as that shown in Figs. 1 through 6 and like reference numerals identify like parts throughout the several views.

Referring now particularly to Fig. 8, there is shown a still further modified form of the present invention wherein the base plate 10b is provided devoid of the protrusions 14a and instead having the longitudinal groove 36 extending longitudinally on the undersurface thereof and within which fits the upwardly extending portion 37 integrally formed at the lower forward end of the C-shaped spring clamp 38, adapted to slide onto the raised portion of the cover plate, substantially as illustrated. The depending portion of the clamp 38 is integrally formed with the spring member 15b for the same purpose as the spring members 15 and 15a previously described. In this case the clamps 38 will be slid onto the cover plate and base plate from opposite ends and will firmly retain the latter in operative engagement with each other and the blade securely therebetween.

In other respects the form of the invention shown in Fig. 8 is the same as that shown in Figs. 1 through 6, and like reference numerals identify like parts throughout the several views.

It will be readily apparent that either of the above three devices may be used with either the elongated double edge blades 27, the conventional double edge blades or the straight or single edge blades 32.

The handle 22, 25, 26 is formed of a unitary piece of steel and can be covered with rubber of any color, the handle being adapted to fit the hand well and to provide the proper slant for best cutting results and minimum wear on the blades. When using the shaft 33, wrist action is employed in the same manner as putting a golf ball. In fact, either handle requires only wrist action and you do not have to swing hard to cut or trim any grass or weeds. However, the device is not recommended for cutting tall dry weeds.

As shown in Fig. 2, a resilient guard or sheathe 40 of substantially U-shaped cross section is adapted to resiliently fit onto the cutting edge of the blade as shown in Fig. 3, when not in use. It may be made in two pieces instead of one to permit the use of a portion of the cutting edge, for example when cutting flowers. The guard 40 may be made of metal or plastic.

The bottom plate 10 and the cover plate 19 may be formed of steel, a die casting, extruded aluminum or any other suitable material. It may also be possible to form the main body of plastic, fiber glass or other suitable material.

Instead of using the protrusion 18 on the undersurface of the spring members 15, they may also be provided with a wing nut assembly which will pierce the blade and coverplate without departing from the spirit and scope of the invention. The upwardly offset portion 25 of the handle will provide proper swing for wrist action during cutting.

With the device as described, it will be noted that no studs are required to hold the blades firmly in position.

In the form of the invention of Fig. 8, a unitary slide 38 may be employed, locking the cover plate and blade in the device when positioned centrally thereon.

The device is light in weight, fits the hand perfectly, requires no hard swinging as it is shaped to trim the grass with only a slight wrist action. It will cut up close to walls, and around flowers and flower beds where the mower cannot get. It can also be used as a knife to cut flowers or the like.

It will be noted that the sole device can be used for both single and double edge blades. The device is provided with a minimum of parts and is easier and quicker than changing blades in case of breakage. It can be made of extruded aluminum requiring practically no machine work except cutting and punching the two holes in the handle.

While various changes may be made in the detail construction, it shall be understood that such changes shall be within the spirit and scope of the present invention as defined by the appended claim.

What I claim as new and desire to protect by Letters Patent of the United States is:

A lawn trimmer comprising an elongated base plate having a back wall and a first forwardly and upwardly opening longitudinally extending recess, a substantially rectangular cover plate removably supported within said recess, said base plate having a second recess extending longitudinally within said first recess, the lower surface of said cover plate having a longitudinally extending recess adjacent to and similar to said second recess, a plurality of blades having rearwardly disposed shields removably disposed within said second plate recess and said cover recess, releasable means locking said cover plate to said base plate, the forward edges of said blades extending forwardly and outwardly between said base plate and said cover plate beyond the forward edge of said base plate, all of said blades being in axial alignment with each other and with said base plate and said cover plate, and handle means associated with said base plate for operating said trimmer, said releasable means comprising said bottom plate on the undersurface thereof having a longitudinally extending groove near the edge thereof remote from the exposed cutting edge, a C-shaped slide adapted to fit onto the end of the base plate member with an upwardly extending portion residing in said groove, the upper end of said slide extending downwardly within said recessed portion and terminating in a spring finger engaging the upper surface of said cover plate means, said spring finger on the undersurface thereof having a protrusion, said cover plate means having a recess adapted to receive said protrusion, said spring member on the upper surface thereof having a thumb engaging protrusion to facilitate the sliding movement of said slide.

References Cited in the file of this patent

UNITED STATES PATENTS

| | | |
|---|---|---|
| 1,817,262 | McGirr | Aug. 4, 1931 |
| 2,070,190 | Wells | Feb. 9, 1937 |
| 2,528,059 | Kendrick | Oct. 31, 1950 |
| 2,587,336 | Larson | Feb. 26, 1952 |
| 2,679,100 | Ehler | May 25, 1954 |

FOREIGN PATENTS

| | | |
|---|---|---|
| 642,250 | Great Britain | Aug. 30, 1950 |